(12) United States Patent
Han et al.

(10) Patent No.: US 9,106,147 B2
(45) Date of Patent: Aug. 11, 2015

(54) UNIVERSAL POWER SUPPLY APPARATUS

(71) Applicant: SAMSUNG ELECTRO-MECHANICS CO., LTD., Suwon, Gyunggi-do (KR)

(72) Inventors: Sang Kyoo Han, Daejeon (KR); Moon Hwan Keum, Gyeonggi-do (KR); Young Seung Noh, Gyunggi-do (KR); Bo Mi Lee, Gyunngi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 122 days.

(21) Appl. No.: 13/843,468

(22) Filed: Mar. 15, 2013

(65) Prior Publication Data

US 2014/0159696 A1 Jun. 12, 2014

(30) Foreign Application Priority Data

Dec. 7, 2012 (KR) ........................ 10-2012-0141986

(51) Int. Cl.
*H02M 3/156* (2006.01)
*H02M 3/335* (2006.01)
*H02M 1/00* (2007.01)

(52) U.S. Cl.
CPC .. *H02M 3/33576* (2013.01); *H02M 2001/0035* (2013.01); *Y02B 70/16* (2013.01)

(58) Field of Classification Search
CPC . H02M 3/156; H02M 3/1584; H02M 3/1588; G05F 3/24; G05F 1/56; G05F 1/575; G05F 1/595
USPC ............... 323/265, 267, 268, 271, 273, 282; 307/104
See application file for complete search history.

(56) References Cited

U.S. PATENT DOCUMENTS

| 7,071,668 | B2 | 7/2006 | Sasaki | |
|---|---|---|---|---|
| 8,258,761 | B2* | 9/2012 | Hammerstrom | ............... 323/207 |
| 8,370,650 | B2* | 2/2013 | Paniagua et al. | ............... 713/300 |
| 8,558,411 | B2* | 10/2013 | Baarman et al. | ............... 307/104 |
| 8,699,241 | B2* | 4/2014 | Ryu et al. | ................... 363/21.12 |
| 2014/0035387 | A1* | 2/2014 | Baarman et al. | ............... 307/104 |

FOREIGN PATENT DOCUMENTS

| JP | 2009-219219 A | 9/2009 |
|---|---|---|
| KR | 10-0539853 | 12/2005 |
| KR | 2011-0062549 A | 6/2011 |

* cited by examiner

*Primary Examiner* — Adolf Berhane
(74) *Attorney, Agent, or Firm* — McDermott Will & Emery LLP

(57) ABSTRACT

There is provided a universal power supply apparatus including a power supply unit switching input power into driving power having a preset voltage level and supplying the driving power, a power recognition unit outputting a recognition voltage having a preset voltage level to an output terminal from which the power is output to recognize connection of a device, controlling a power output of the power supply unit according to a detected rated output, and recognizing disconnection of the device after the connection of the device according to a power state of the driving power of the power supply unit, and a detection unit providing a detection voltage having a preset voltage level to the output terminal.

14 Claims, 5 Drawing Sheets

UNIVERSAL POWER SUPPLY APPARATUS

CROSS-REFERENCE TO RELATED APPLICATIONS

This application claims the priority of Korean Patent Application No. 10-2012-0141986 filed on Dec. 7, 2012, in the Korean Intellectual Property Office, the disclosure of which is incorporated herein by reference.

BACKGROUND OF THE INVENTION

1. Field of the Invention

The present invention relates to a universal power supply apparatus able to supply power to various devices.

2. Description of the Related Art

With regard to mobile electronic devices, the recent tendency has been for devices systemized with other devices, digitized devices, wireless communications enabled-devices, multimedia devices, intelligent devices, complex devices, and the like. Among these devices, social interest in the multimedia devices has increased, and thus, miniaturized and mobile multimedia devices have come to prominence.

Among miniaturized and mobile multimedia devices, smartphones and tablet PCs have attracted particular attention as new information devices. Thus, there is an increasing need for new technological requirements for driving power supply apparatus such as an adapter for charging batteries of these devices.

In an existing driving power supplying apparatus, only standby power is regulated in public. However, as various functions such as a touch screen function are added to a mobile device, there is a need to minimize influence on a body of a device when the device is being charged by the driving power supply.

As various mobile devices are used, there is a need for research into a new driving power supply that is applicable to various mobile devices that require different power voltages.

Mobile devices have various rated power specifications corresponding to various types of device, and thus, there is a need for unique driving power supplies according to respective devices. Accordingly, a user may experience an economic burden and needs to prepare driving power supplies corresponding to the number of types of used mobile device.

In order to address this problem, input voltages of mobile devices are shared with each other as, for example, 5 V. However, in this case, when input power is required to be high, such as in the case of a notebook computer, a large amount of current is required. Accordingly, there is a need for a separate heat dissipation device for absorbing heat generated by a device.

That is, the size of a driving power supply apparatus may be necessarily increased, thereby increasing costs.

In order to obtain miniaturization and to reduce manufacturing costs, an inexpensive device having low pressure is used. On the other hand, when an output voltage is increased to, for example, 12 V, current flowing through a device (e.g., a smartphone) having a low input voltage is reduced, but an internal pressure of the device needs to be increased by as much as the increased voltage. In general, a device with a high degree of internal pressure has a large size and a high cost, and thus, it may be difficult to use a driving power supply for providing a single voltage level to various devices.

In order to address this problem, an integrated power supply is introduced as disclosed in the Cited Reference. However, such a conventional integrated power supply includes power circuits in order to provide various voltage levels, thereby increasing a volume thereof and increasing manufacturing costs.

Accordingly, in order to address this problem, there is a need to develop a new driving power supply apparatus that may be used in various devices.

RELATED ART DOCUMENT (Patent Document 1) Korean Laid-Open Patent Publication No. 10-2011-0062549

SUMMARY OF THE INVENTION

An aspect of the present invention provides a universal power supply apparatus by which one power supply apparatus may be commonly used to various devices of which driving power has different voltage levels and current levels and may stably stop power supply when the connection of a device is released during the power supply.

According to an aspect of the present invention, there is provided a universal power supply apparatus including a power supply unit switching input power into driving power having a preset voltage level and supplying the driving power; a power recognition unit outputting a recognition voltage having a preset voltage level to an output terminal from which the power is output to recognize connection of a device, controlling a power output of the power supply unit according to a detected rated output, and recognizing disconnection of the device after the connection of the device according to a power state of the driving power of the power supply unit; and a detection unit providing a detection voltage having a preset voltage level to the output terminal.

The power recognition unit may recognize the disconnection of the device based on the power state of the driving power according to changes in a switching mode of the power supply unit during the disconnection of the device.

The power supply unit may include a switching unit switching the input power in a preset normal mode and switching the input power in a preset burst mode when the connection of the device is released after the input power is switched in the normal mode; an outputting unit transforming the power switched by the switching unit to output the power; and a connection and disconnection detecting unit detecting the connection and disconnection of the device based on the power switched by the switching unit.

The power recognition unit may stop the power output of the power supply unit when the connection of the device is released, according to a detection signal from the connection and disconnection detecting unit.

The power recognition unit may control the voltage level of the detection voltage to be changed to a preset voltage level when the detection voltage of which the voltage level is reduced is equal to or greater than a reference voltage reduction level.

The power recognition unit may output the driving power of the power supply unit when the reduced voltage level of the detection voltage is equal to or less than the reference voltage reduction level.

The detection voltage may have the same voltage level as the voltage level of the driving power.

The detection unit may change the voltage level of the driving power to set the voltage level of the detection voltage.

According to another aspect of the present invention, there is provided a universal power supply apparatus including a power supply unit switching input power into driving power having a preset voltage level and supplying the driving power;

a power recognition unit recognizing connection of a device according to impedance fluctuations in an output terminal from which the power is output, controlling power supply of the power supply unit according to a detected rated output, and recognizing disconnection of the device after the connection of the device according to a power state of the driving power of the power supply unit; and a detection unit providing a detection voltage having a preset voltage level to the output terminal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
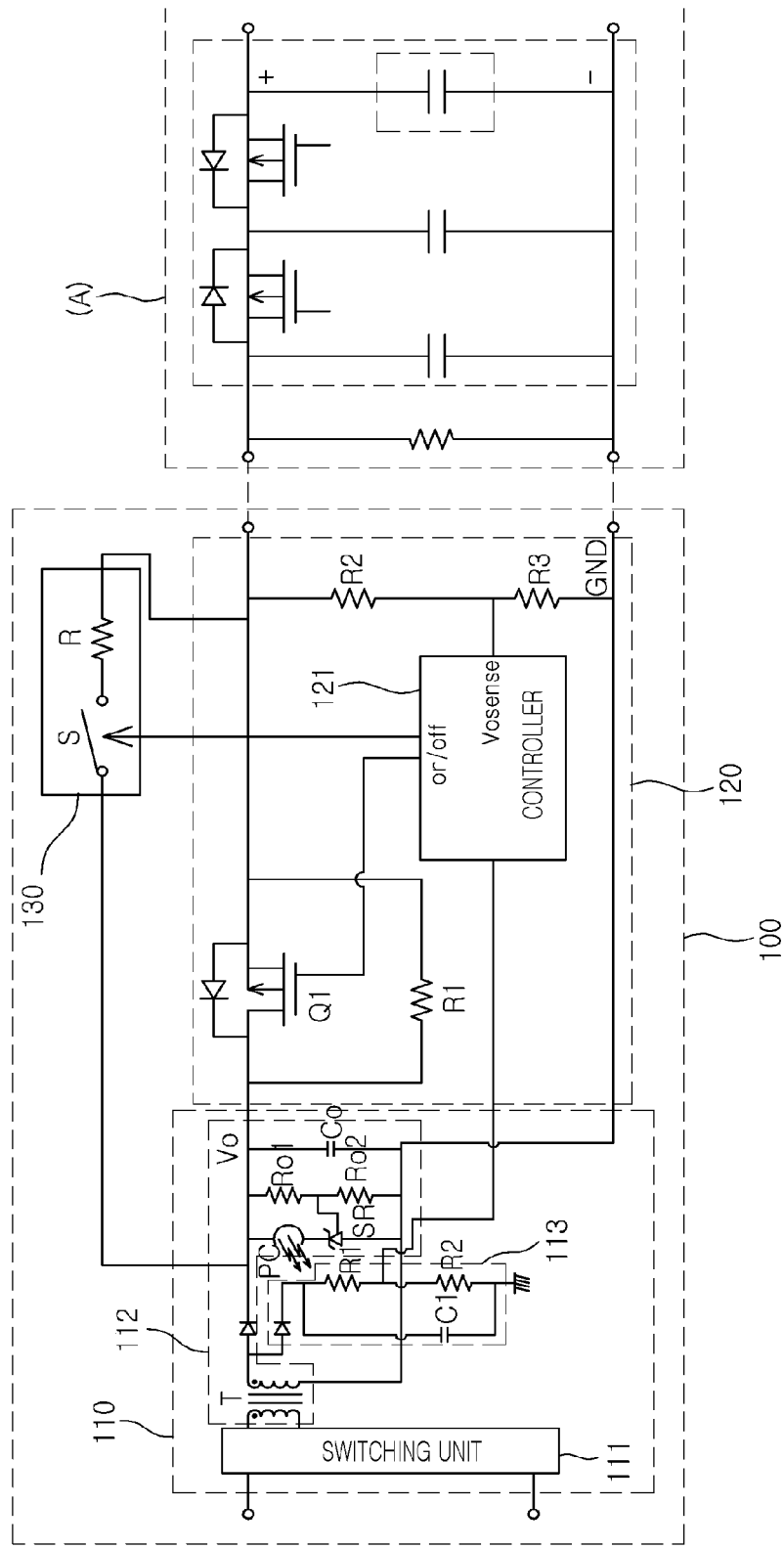
FIG. 1 is a schematic circuit diagram of a universal power supply apparatus according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
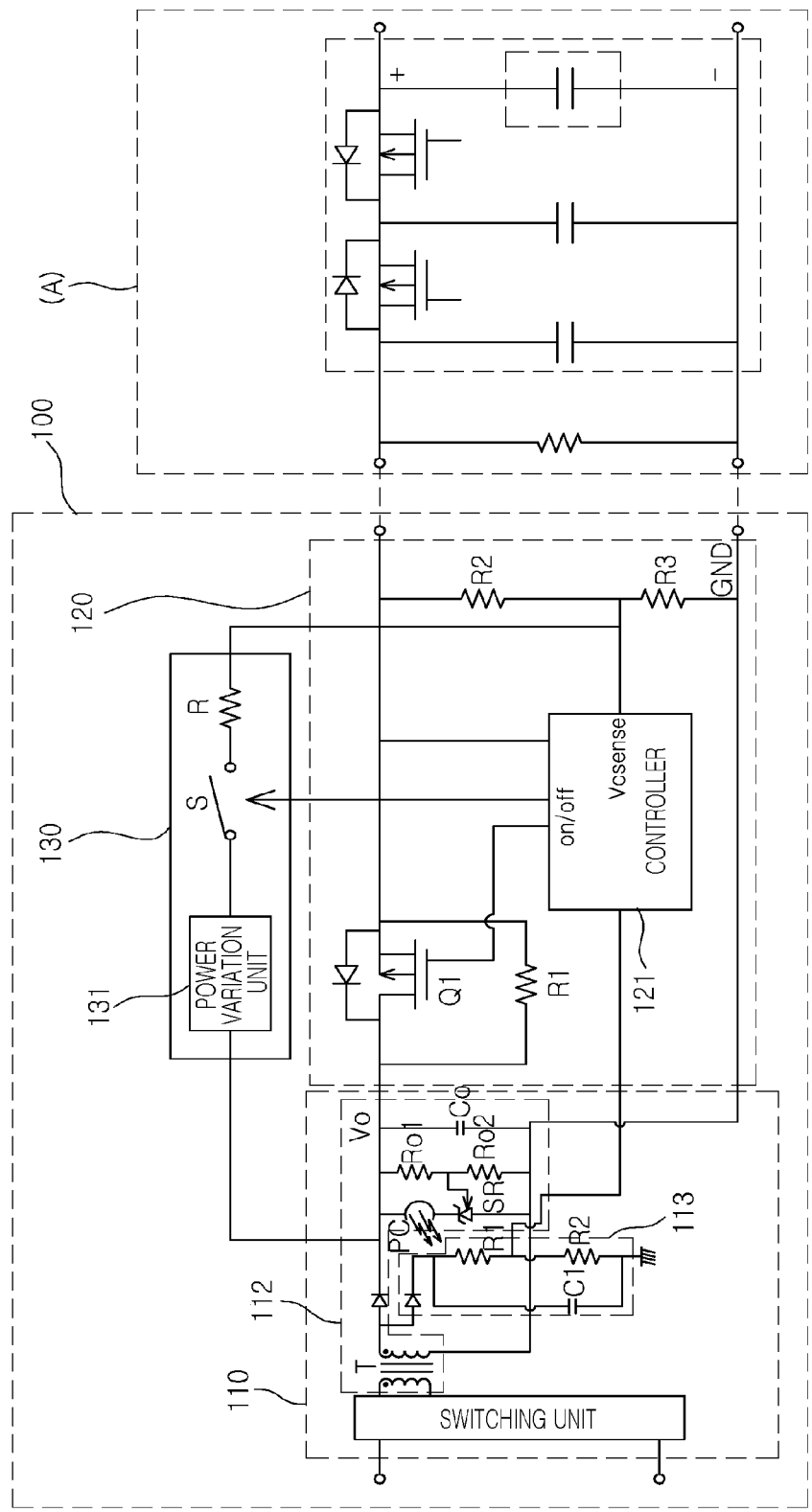
FIG. 2 is a schematic circuit diagram of a universal power supply apparatus according to another embodiment of the present invention.

FIG. 1 is a schematic circuit diagram of a universal power supply apparatus according to an embodiment of the present invention. FIG. 2 is a schematic circuit diagram of a universal power supply apparatus according to another embodiment of the present invention.

According to an embodiment of the present invention, referring to FIG. 1, a universal power supply apparatus 100 may include a power supply unit 110, a power recognition unit 120, and a detection unit 130.

The power supply unit 110 may convert input power into driving power having a preset voltage level and may supply the driving power.

In more detail, the power supply unit 110 may include a switching unit 111 switching the input power, an outputting unit 112 transforming the switched power to output the power, and a connection and disconnection detecting unit 113 detecting connection and disconnection of a device A based on the switched power.

The switching unit 111 may switch the input power in a normal mode or a burst mode. In the normal mode, a normal switching operation is performed according to a state of output power. In the burst mode, an intermittent switching operation is performed. When the connection of the device A is released after the connection is recognized, a level of load is reduced to a minimum load level required for the switching operation in the normal mode or lower and thus, the switching unit 111 may perform the switching operation in the burst mode.

The outputting unit 112 may output the power obtained by transforming the switched power through a transformer T, regulating the transformed power through a voltage regulator SR having a reference voltage that is set by resistors Ro1 and Ro2, and stabilizing the regulated power through a capacitor Co.

The connection and disconnection detecting unit 113 may detect the disconnection of the device A after recognizing the connection of the device A, based on a state of the power transformed by a secondary side of the transformer T, and may detect the connection of the device A after recognizing the connection of the device A based on a voltage level of the transformed power or an output period of the transformed power according to whether a capacitor C1 exists.

Figure 3:
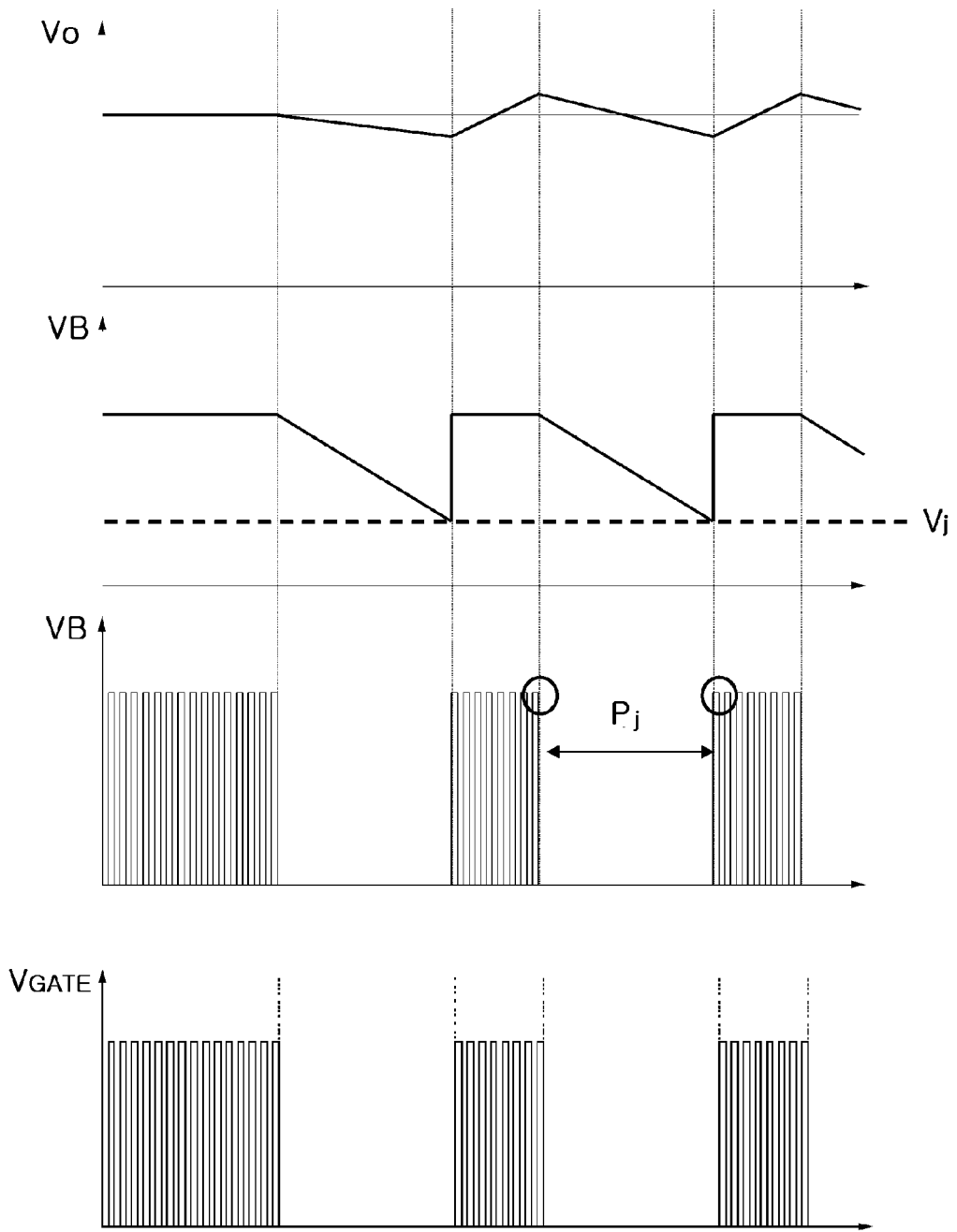
FIG. 3 is a diagram illustrating signal waveforms of main parts of the universal power supply apparatus according to the embodiment of the present invention.

FIG. 3 is a diagram illustrating signal waveforms of main parts of the universal power supply apparatus according to the embodiment of the present invention.

Referring to FIG. 3, output power Vo of the power supply unit 110 of the universal power supply apparatus according to the present embodiment may have a load state reduced when the device is disconnected after the connection thereof is recognized. Thus, the switching unit 111 may perform a switching operation in a burst mode VGATE in which the intermittent switching operation is performed. When the capacitor C1 exists, if a detection signal from the connection and disconnection detecting unit 113 is equal to or less than a specific voltage Vj, the power recognition unit 120 may recognize the disconnection. While when the capacitor C1 does not exist, if a switching operation is performed in a specific period Pj or greater, the power recognition unit 120 may recognize the disconnection.

The power recognition unit 120 may recognize that the device A is connected to an output terminal from which the driving power is output and may transmit the driving power from the power supply unit 110 to the device A. In addition, after recognizing the connection of the device A, the power recognition unit 120 may recognize the disconnection of the device A.

As described above, the power recognition unit 120 may recognize that the device A is electrically connected to the output terminal from which the driving power is output. In this regard, the connection may be detected by impedance fluctuations in the output terminal or a recognition voltage of which a voltage level is reduced from a preset voltage level.

That is, the power recognition unit 120 may include detection resistors R2 and R3 connected to the output terminal, and may further include a controller 121 coupled to a resistor R4 connected to a power input terminal of the device A to detect impedance fluctuations generated therein or outputting a recognition voltage for recognizing the connection of the device A through the output terminal to recognize the connection of the device A.

When a degree of impedance fluctuations is equal to or greater than a preset reference value or when the recognition voltage is reduced to a preset reference level, the controller 121 may recognize the connection of the device A.

In addition, the power recognition unit 120 may further include a switch Q. The switch Q may be turned on or off according to a control of the controller 121 to connect or disconnect a path of the driving power to the device A from the power supply unit 110 through the output terminal.

Even if the device A is connected to the output terminal, the driving power having a preset rated level of the device A needs to be supplied to the device A.

Thus, the detection unit 130 may output a detection voltage for detecting rated power of the device A through the output terminal.

When a voltage level of the detection voltage corresponds to a voltage level of the rated power of the device A, the voltage level of the detection voltage is reduced to be equal to or less than a preset reference voltage reduction level. When the voltage level of the detection voltage does not correspond to the voltage level of the rated power of the device A, even if the voltage level of the detection voltage is reduced, the reduced voltage level may be equal to or greater than the preset reference voltage reduction level.

Thus, when the detection voltage is reduced to be equal to or less than the reference voltage reduction level, the controller 121 may turn off a switch S of the detection unit 130 to stop the output of the detection voltage and may turn on the switch Q to supply the driving power from the power supply unit 110 to the device A through the output terminal.

To this end, the detection unit 130 may include the switch S and a resistor R that allows a small amount of current to flow along a path through which the detection voltage is transmitted.

When the voltage level of the detection voltage is equal to or greater than the reference voltage reduction level, the controller 121 may change the voltage level of the detection voltage in order to detect the rated power of the device A.

To this end, the controller 121 may control the voltage level of the driving power from the power supply unit 110 to be changed and allow the voltage level of the driving power to be identical to the voltage level of the detection voltage or control the detection unit 130 to change the voltage level of the detection voltage.

To this end, the detection unit 130 may include a power variation unit 131 that changes the voltage level of the driving power from the power supply unit 110 to variably set the voltage level of the detection voltage, as shown in FIG. 2.

The voltage level of the detection voltage may be changed to a preset voltage level, and in detail, may be changed into a preset voltage level unit, for example, a step voltage level. In this case, the voltage level may gradually increase or decrease.

Figure 4:
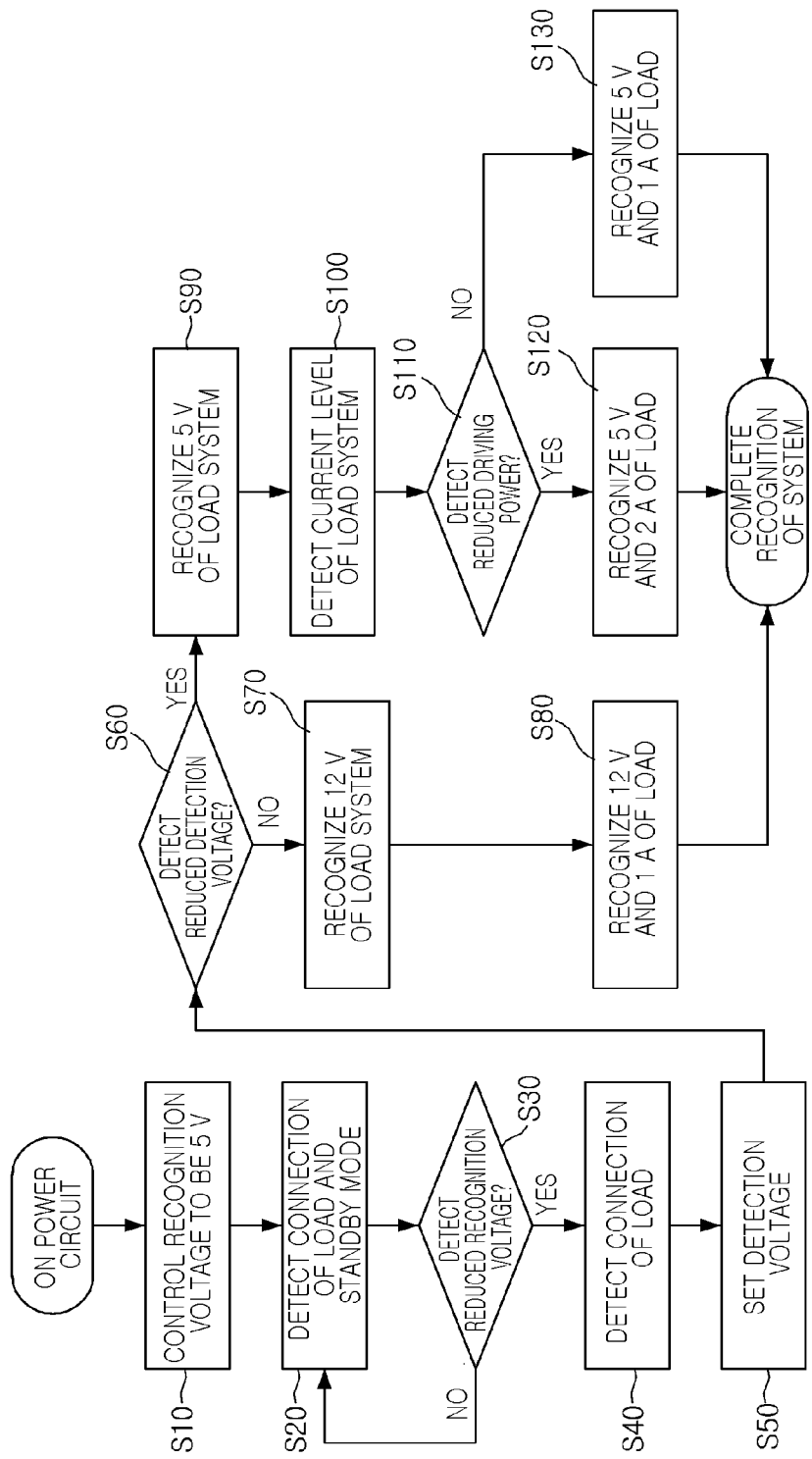
FIGS. 4 and 5 are schematic flowcharts each illustrating a universal power supply method according to an embodiment of the present invention.
Figure 5:
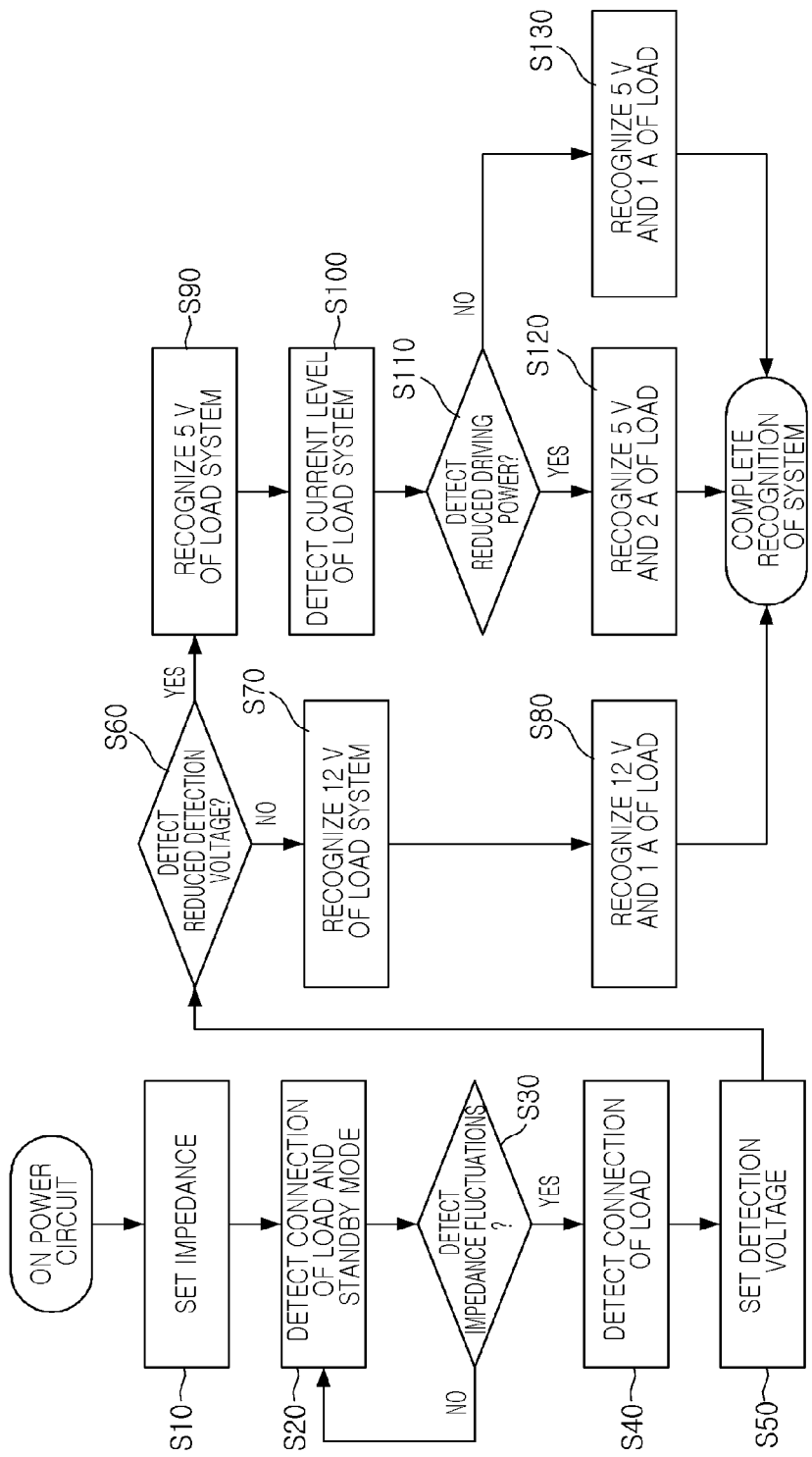

FIGS. 4 and 5 are schematic flow charts each illustrating a universal power supply method according to an embodiment of the present invention.

Referring to FIGS. 4 and 5 together with FIGS. 1 and 2, in the universal power supply method according to the present embodiment, the connection or disconnection of the device A to and from the output terminal may be detected.

The connection or disconnection may be detected by a method in which the controller 121 outputs a recognition voltage through the output terminal and detects the recognition voltage of which a voltage level is reduced (S10 to S40 of FIG. 4) or by detecting impedance fluctuations in the output terminal (S10 to S40 of FIG. 4).

In the case of recognizing the connection and disconnection of the device A by detecting impedance fluctuations, the output terminal of the universal power supply apparatus 100 may have impedance set by the detection resistors R2 and R3.

Then, when the device A is electrically connected to the output terminal, the impedance of the output terminal fluctuates by the resistor R4 of the device A. Then, when the impedance fluctuations are detected, the connection of the device A, that is, a load may be detected (S20 to S40 of FIG. 4).

On the other hand, in the case of recognizing the connection and disconnection of the device A by detecting the recognition voltage of which a voltage level is reduced, the controller 121 may output the recognition voltage through the output terminal. When a resistance component of the output terminal changes due to the connection of the device A to reduce the recognition voltage, if the reduced voltage level is equal to or less than the reference voltage level, the connection of the device A may be detected (S20 to S40 of FIG. 4).

Then, the rated power level required to drive or charge the device A needs to be recognized (S50), and thus, the detection unit 130 outputs the detection voltage having a preset voltage level and the controller 121 detects the reduced voltage level of the detection voltage (S60). (A detailed description of operations of FIG. 5, which are the same as in FIG. 4, will be omitted).

When the reduced voltage level of the detection voltage is equal to or less than a preset reference voltage reduction level, the currently set voltage level is maintained and the driving power having the voltage level may be output. When the reduced voltage level of the detection voltage is equal to or greater than the preset reference voltage reduction level, the voltage level of the detection voltage may be changed.

For example, when a detection voltage having a voltage level of 5 V is output and is reduced to 3 V, it is determined that the current voltage level is appropriate for rated power required by the device A, the output of the detection voltage is stopped, and the driving power having the current voltage level is output to the device A. When the voltage level of the detection voltage is not reduced to about 3 V, it is determined that the voltage level is not appropriate for the rated power required by the device A, and the voltage level of the detection voltage may be changed (S70 and S90).

The voltage level of the detection voltage may be differently set according to types of the device A. When the device A to be used has two rated power levels, for example, 5 V or 12 V, if the voltage level is not dropped from 5 V, the voltage level of the driving power may be increased directly to 12 V.

On the other hand, when the device A has various types of rated power levels, the voltage level of the detection voltage may be gradually changed, and for example, may be repeatedly changed until a desired drop in voltage occurs.

Meanwhile, the rated power of the device A may have a voltage level and a current level. In this regard, the universal power supply apparatus 100 may set the voltage level of the driving power and then may set the current level thereof.

The current level may also be differently set according to the device A to be used, for example, a device that requires a current level of 1 A or 2 A at a voltage level of 5 V.

To this end, the driving power having the same voltage level as a detection voltage of 5 V is supplied to the device A at a current level of 1 A. Then, when a reduced voltage level of the driving power is equal or similar to a reduced voltage level of the detection value, it is recognized that 1 A is a rated current level, and the current level is maintained. When the reduced voltage level of the driving power is different from the reduced voltage level of the detection voltage, the current level may be changed to 2 A (S100 to S130). A device having a voltage level of 12 V is shown to have a current level of 1 A as a rated current level, which may be variously changed (S80).

That is, when the device A has various rated current levels, the current level of the driving power may be gradually changed, and for example, may be repeatedly changed until a desired drop in voltage occurs.

As is apparent from the above description, according to the embodiments of the present invention, one power supply apparatus may be commonly used to various devices of which driving power has different voltage levels and current levels, may stably stop power supply even if the connection of a device is released during the power supply, and then may be connected to the device to smoothly supply different levels of rated power to the device requiring the different levels of rated power.

As set forth above, according to the embodiments of the present invention, one power supply apparatus may be commonly used to various devices of which driving power has different voltage levels and current levels, may stably stop power supply even if the connection of a device is released during the power supply.

While the present invention has been shown and described in connection with the embodiments, it will be apparent to those skilled in the art that modifications and variations can be made without departing from the spirit and scope of the invention as defined by the appended claims.

What is claimed is:

1. A universal power supply apparatus, comprising:
    a power supply unit switching input power into driving power having a preset voltage level and supplying the driving power;
    a power recognition unit outputting a recognition voltage having a preset voltage level to an output terminal from which the power is output to recognize connection of a device, controlling a power output of the power supply unit according to a detected rated output, and recognizing disconnection of the device after the connection of the device according to a power state of the driving power of the power supply unit; and
    a detection unit providing a detection voltage having a preset voltage level to the output terminal,
    wherein the power recognition unit recognizes the disconnection of the device based on the power state of the driving power according o changes in a switching mode of the power supply unit during the disconnection of the device.

2. The universal power supply apparatus of claim 1, wherein the power supply unit includes:
    a switching unit switching the input power in a preset normal mode and switching the input power in a preset burst mode when the connection of the device is released after the input power is switched in the normal mode;
    an outputting unit transforming the power switched by the switching unit to output the power; and
    a connection and disconnection detecting unit detecting the connection and disconnection of the device based on the power switched by the switching unit.

3. The universal power supply apparatus of claim 2, wherein the power recognition unit stops the power output of the power supply unit when the connection of the device is released, according to a detection signal from the connection and disconnection detecting unit.

4. The universal power supply apparatus of claim 1, wherein the detection voltage has the same voltage level as the voltage level of the driving power.

5. The universal power supply apparatus of claim 1, wherein the detection unit changes the voltage level of the driving power to set the voltage level of the detection voltage.

6. A universal power supply apparatus of, comprising:
    a power supply unit switching input power into driving power having a preset voltage level and supplying the driving power;
    a power recognition unit outputting a recognition voltage having a preset voltage level to an output terminal from which the power is output to recognize connection of a device, controlling a power output of the power supply unit according to a detected rated output, and recognizing disconnection of the device after the connection of the device according to a power state of the driving power of the power supply unit; and
    a detection unit providing a detection voltage having a preset voltage level to the output terminal,
    wherein the power recognition unit controls the voltage level of the detection voltage to be changed to a preset voltage level when the detection voltage of which the voltage level is reduced is equal to or greater than a reference voltage reduction level.

7. The universal power supply apparatus of claim 6, wherein the power recognition unit outputs the driving power of the power supply unit when the reduced voltage level of the detection voltage is equal to or less than the reference voltage reduction level.

8. A universal power supply apparatus, comprising:
    a power supply unit switching input power into driving power having a preset voltage level and supplying the driving power;
    a power recognition unit recognizing connection of a device according to impedance fluctuations in an output terminal from which the power is output, controlling power supply of the power supply unit according to a detected rated output, and recognizing disconnection of the device after the connection of the device according to a power state of the driving power of the power supply unit; and
    a detection unit providing a detection voltage having a preset voltage level to the output terminal,
    wherein the power recognition unit recognizes the disconnection of the device based on the power state of the driving power according to changes in a switching mode of the power supply unit during the disconnection of the device.

9. The universal power supply apparatus of claim 8, wherein the power supply unit includes:
    a switching unit switching the input power in a preset normal mode and switching the input power in a preset burst mode when the connection of the device is released after the input power is switched in the normal mode;
    an outputting unit transforming the power switched by the switching unit to output the power; and
    a connection and disconnection detecting unit detecting the connection and disconnection of the device based on the power switched by the switching unit.

10. The universal power supply apparatus of claim 9. wherein the power recognition unit stops the power output of the power supply unit when the connection of the device is released, according to a detection signal from the connection and disconnection detecting unit.

11. The universal power supply apparatus of claim 8, wherein the detection voltage has the same voltage level as the voltage level of the driving power.

12. The universal power supply apparatus of claim 8, wherein the detection unit changes the voltage level of the driving power to set the voltage level of the detection voltage.

13. A universal power supply apparatus, comprising:
    a power supply unit switching input power into driving power having a preset voltage level and supplying the driving power;
    a power recognition unit recognizing connection of a device according to impedance fluctuations in an output terminal from which the power is output, controlling power supply of the power supply unit according to a detected rated output, and recognizing disconnection of the device after the connection of the device according to a power state of the driving power of the power supply unit; and a detection unit providing a detection voltage having a preset voltage level to the output terminal, wherein the power recognition unit controls the voltage level of the detection voltage to be changed to a preset voltage level when the detection voltage of which the voltage level is reduced is equal to or greater than a reference voltage reduction level.

14. The universal power supply apparatus of claim 13, wherein the power recognition unit outputs the driving power of the power supply unit when the reduced voltage level of the detection voltage is equal to or less than the reference voltage reduction level.

* * * * *